(12) United States Patent
Lundby et al.

(10) Patent No.: US 8,463,310 B2
(45) Date of Patent: *Jun. 11, 2013

(54) APPARATUS, SYSTEM, AND METHOD FOR MANAGING REVERSE LINK COMMUNICATION

(75) Inventors: Stein A. Lundby, Solana Beach, CA (US); Avinash Jain, San Diego, CA (US); Joseph P. Odenwalder, Rancho Santa Fe, CA (US); Sandip Sarkar, San Diego, CA (US); Tao Chen, La Jolla, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/749,984

(22) Filed: Mar. 30, 2010

(65) Prior Publication Data

US 2010/0182957 A1 Jul. 22, 2010

Related U.S. Application Data

(63) Continuation of application No. 11/621,551, filed on Jan. 9, 2007, now Pat. No. 7,720,501, which is a continuation of application No. 10/933,727, filed on Sep. 2, 2004, now Pat. No. 7,630,731.

(60) Provisional application No. 60/501,563, filed on Sep. 8, 2003, provisional application No. 60/501,450, filed on Sep. 8, 2003.

(51) Int. Cl.
*H04W 52/18* (2009.01)
(52) U.S. Cl.
USPC ........... 455/522; 455/127.1; 455/69; 370/318

(58) Field of Classification Search
None
See application file for complete search history.

(56) References Cited

U.S. PATENT DOCUMENTS 5,621,737 A 4/1997 Bucher
5,933,781 A 8/1999 Willenegger et al.
(Continued)

FOREIGN PATENT DOCUMENTS

CA 2288779 A1 9/1999
CA 2398637 A1 8/2001
(Continued)

OTHER PUBLICATIONS

3rd Generation Partnership Project 2 "3GPP2", 3GPP2 C.S0003-D, Medium Access Control (MAC) Standard for cdma2000 Spread Spectrum Systems Release D Version 1.0, Feb. 13, 2004, pp. 187-192.

(Continued)

*Primary Examiner* — Philip Sobutka
(74) *Attorney, Agent, or Firm* — D. Scott Juneau

(57) ABSTRACT

An apparatus, system, and method efficiently manage reverse link resources by allowing a mobile station to select between transmitting a payload at a standard power level and transmitting a smaller payload at a boosted power level. The mobile station, therefore, can autonomously select a QoS (Quality of Service) level for physical layer packets. Based on reverse link transmission information received from a base station, the mobile station derives a reverse link transmission guideline defining the power levels and associated payloads for at least a standard service and boosted service. The mobile station selects a reverse link transmission power level from a plurality of power levels including at least a standard reverse link transmission power level associated with a standard payload size and a boosted reverse link transmission power level associated with a boosted payload size where the standard payload size is greater than the boosted payload size.

20 Claims, 3 Drawing Sheets

U.S. PATENT DOCUMENTS

| | | | |
|---|---|---|---|
| 6,208,873 | B1 | 3/2001 | Black et al. |
| 6,425,105 | B1 | 7/2002 | Piirainen et al. |
| 6,529,482 | B1 | 3/2003 | Lundby |
| 6,571,089 | B1 | 5/2003 | Richards et al. |
| 6,595,659 | B2 | 7/2003 | Wong |
| 6,628,956 | B2 | 9/2003 | Bark et al. |
| 6,819,935 | B2 | 11/2004 | Kenney et al. |
| 6,836,666 | B2 | 12/2004 | Gopalakrishnan et al. |
| 6,879,577 | B2 | 4/2005 | Lee |
| 6,898,437 | B1 | 5/2005 | Larsen et al. |
| 7,046,966 | B2 | 5/2006 | Davis |
| 7,068,683 | B1 | 6/2006 | Lundby et al. |
| 7,069,037 | B2 | 6/2006 | Lott et al. |
| 7,092,731 | B2 | 8/2006 | Gopalakrishnan et al. |
| 7,110,785 | B1 | 9/2006 | Paranchych et al. |
| 7,190,964 | B2 | 3/2007 | Damnjanovic et al. |
| 7,193,976 | B2 | 3/2007 | Chun |
| 7,194,280 | B2 | 3/2007 | Vanghi |
| 7,215,653 | B2 | 5/2007 | Kim et al. |
| 7,280,510 | B2 | 10/2007 | Lohtia et al. |
| 7,283,482 | B2 | 10/2007 | Koo et al. |
| 7,630,731 | B2 * | 12/2009 | Lundby et al. ................ 455/522 |
| 7,720,501 | B2 * | 5/2010 | Lundby et al. ................ 455/522 |
| 7,724,701 | B2 | 5/2010 | Lundby et al. |
| 2001/0053128 | A1 | 12/2001 | Lee |
| 2002/0054578 | A1 | 5/2002 | Zhang et al. |
| 2002/0150077 | A1 | 10/2002 | Temerinac |
| 2003/0039267 | A1 | 2/2003 | Koo et al. |
| 2003/0040311 | A1 | 2/2003 | Choi |
| 2003/0078010 | A1 | 4/2003 | Davis |
| 2003/0081572 | A1 | 5/2003 | Kim et al. |
| 2003/0218997 | A1 | 11/2003 | Lohtia et al. |
| 2004/0176124 | A1 | 9/2004 | Gopalakrishnan et al. |
| 2005/0124372 | A1 | 6/2005 | Lundby et al. |
| 2005/0135320 | A1 | 6/2005 | Tiedemann, Jr. et al. |

FOREIGN PATENT DOCUMENTS

| | | |
|---|---|---|
| EP | 0853393 A1 | 7/1998 |
| JP | 2001128238 A | 5/2001 |
| JP | 2001298409 A | 10/2001 |
| JP | 2002345048 | 11/2002 |
| JP | 2003046482 A | 2/2003 |
| JP | 2003152595 A | 5/2003 |
| JP | 2003174428 A | 6/2003 |
| RU | 2114508 | 6/1998 |
| RU | 2156545 | 9/2000 |
| RU | 2163051 | 2/2001 |
| TW | 200301630 | 7/2003 |
| TW | 200302636 | 8/2003 |
| WO | 9419876 | 9/1994 |
| WO | 9709794 | 3/1997 |
| WO | 0045528 | 8/2000 |
| WO | WO0070902 | 11/2000 |
| WO | WO0178291 A2 | 10/2001 |
| WO | WO0195521 A2 | 12/2001 |
| WO | WO02052757 A1 | 7/2002 |
| WO | WO2005034383 A2 | 4/2005 |

OTHER PUBLICATIONS

European Search Report, EP08015300, European Patent Office, Munich, Germany, Feb. 2, 2009.

International Search Report—PCT/US04/029304, International Search Authority—European Patent Office, Dec. 22, 2004.

Mandyam G et al., "Adaptive Power Allocation in Mixed-QoS CDMA Systems", IEEE, Conf.Record of the 35th. Asilomar, Signals, Systems, & Computers. Pacific Grove, CA, Nov. 4-7, 2001, IEEE, vol. 1 of 2. Conf.35, pp. 705-708, XP010581010, ISBN: 0-7803-7147-X.

Nadagopal T., et al., "Service Differentiation Through End-To-End Rate Control in Low Bandwith Wireless Packet Networks," 1999. IEEE International Workshop. San Diego CA USA Nov. 15-17, 1999, Mobile Mutlimedia Communications 1999, 211-220.

Sarkar S et al., "Adaptive Control of the Reverse Link in CDMA2000", International Journal of Wireless Information Networks, Plenum Press, NY, US, vol. 9, No. Jan. 1, 2002, pp. 55-70, XP002300880, ISSN: 1068-9605, p. 56, right-hand column, line 12—p. 61, right-hand column, line 4, p. 63, left-hand column.

Song et al., "Rate-Control Snoop: A Reliable Transport Protocol for Heterogeneous Networks with Wired and Wireless Links", Mobile Multimedia Communications, 1999 IEEE Int'l Workshop, Nov. 15, 1999, pp. 211-220; XP010370726.

TIA/EIA/IS-95-A "Mobile Station-Base Station Compatibility Standard for Dual-Mode Wideband Spread Spectrum Cellular System", Jul. 1993.

Written Opinion, PCT/US2004/029304, International Searching Authority, European Patent Office, Dec. 22, 2004.

Yun L C et al., "Power Control for Variable QOS on a CDMA Channel", Military Communications Milcom '94. Conference Record, IEEE Fort Monmouth, NJ, USA Oct. 2-5, 1994, NY, USA, IEEE, US, pp. 178-180, XP010149801, ISBN: 0-7803-1828-5.

Yun L C et al., "Variable Quality of Service in CDMA Systems by Statistical Power Control", Communications—Gateway to Globalization. Proceedings of the Conference on Communications. Seattle, Jun. 18-22, 1995, vol. 2, Jun. 18, 1995, pp. 713-719, XP000533105.

Jain, A. et al. "Reverse-Link Control Mechanisms in CDMA2000 Revision D: Performance Evaluation," 15th IEEE International Symposium on Personal, Indoor and Mobile Radio Communications, 2004, PIMRC 2004, vol. 3, pp. 2040-2045, Sep. 5-8, 2004, doi: 10.1109/PIMRC.2004.1368357.

Taiwan Search Report—TW093127212—TIPO—Dec. 12, 2011.

Lundby, S., et al., "T/P Management in Rev.D for QoS Support V2", C30-20030915-069, 3GPP2, Sep. 15, 2003, p. 1-6.

Lundby, S., "T/P. Control for QoS in Rev.D Reverse Link", C30-20030915-084_QC-T2P control-1, 3GPP2, Sep. 15, 2003, p. 1-11.

* cited by examiner

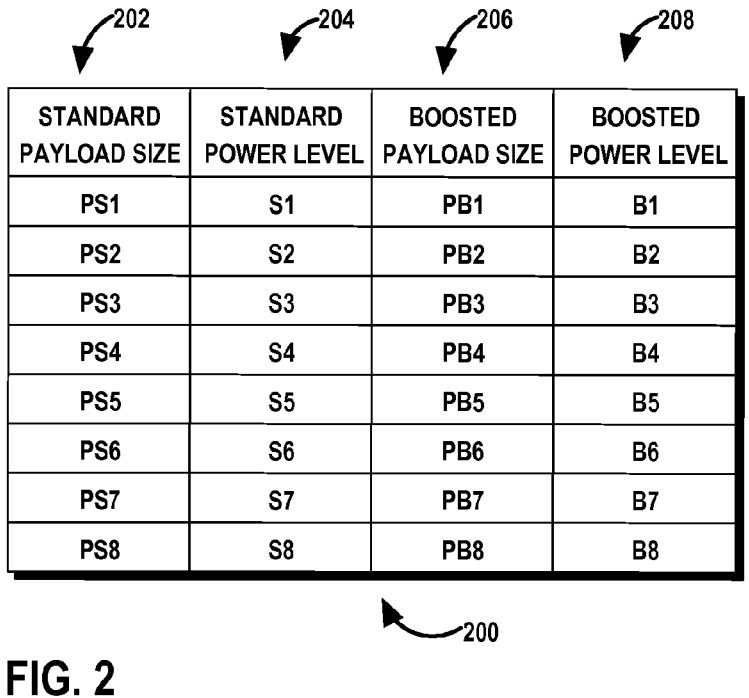
FIG. 2
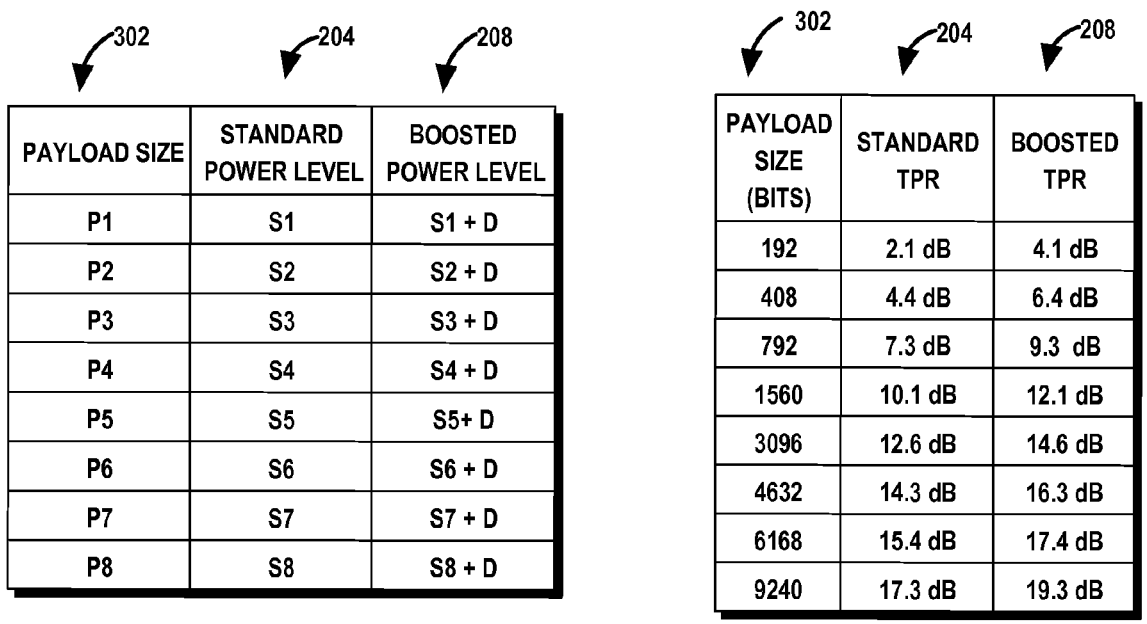
FIG. 3
FIG. 4

APPARATUS, SYSTEM, AND METHOD FOR MANAGING REVERSE LINK COMMUNICATION

CLAIM OF PRIORITY UNDER 35 U.S.C. §120

The present Application for Patent is a Continuation of patent application Ser. No. 11/621,551 entitled "Apparatus, System, and Method for Managing Reverse Link Communication" filed Jan. 9, 2007, now U.S. Pat. No. 7,720,501 issued May 18, 2010 which is a Continuation of patent application Ser. No. 10/933,727 entitled "Apparatus, System, and Method for Managing Reverse Link Communication" filed Sep. 2, 2004, granted as U.S. Pat. No. 7,630,731, which claims the benefit of priority of Provisional Patent Application No. 60/501,563 filed on Sep. 8, 2003, entitled "Method And Apparatus for Traffic-to-Pilot Management for Code Division Multiple Access (CDMA) Reverse Link", and Provisional Patent Application No. 60/501,450, filed on Sep. 8, 2003 entitled "Method And Apparatus for Traffic-to-Pilot Management for Code Division Multiple Access (CDMA) Reverse Link" all of which are incorporated by reference in its entirety herein.

REFERENCE TO CO-PENDING APPLICATIONS FOR PATENT

This application is related to U.S. patent application Ser. No. 10/853,638 filed on May 24, 2004 and entitled "Method and Apparatus for Controlling Reverse Link Data Rate of a Mobile Station in a Communication System with Reverse Link Common Rate Control", pending, which claims priority to Provisional Application No. 60/507,907, filed Sep. 30, 2003, entitled "Data Rate Control For Reverse-Link in a Communication System" both of which are incorporated by reference in its entirety herein.

BACKGROUND OF THE INVENTION

The invention relates in general to communication systems and more specifically to an apparatus, system, and method for managing reverse link resources in a communication system.

Many wireless communication systems employ geographically distributed base stations to provide communication cells or regions where a serving base station provides communication service to mobile stations within the region corresponding to the serving base station. In certain situations, the reverse link signals transmitted from each mobile station to a base station interfere with other reverse link signals transmitted from other mobile stations. Because of the interference and limited resources, the capacity of each base station is limited and many systems manage reverse link resources in order to improve overall performance of the communication system. One method of controlling the reverse link resources includes limiting the transmitted energy of the mobile stations. Some conventional systems incorporate a retransmission mechanism allowing information to be accurately reconstructed and received at the base stations. By limiting the transmission power level to a relatively low power level, reverse link resources are efficiently used while retransmissions allow the accurate reconstruction of transmitted information. A retransmission scheme results in an increased system capacity for time varying channels since an early termination of the retransmission scheme occurs when a good channel is utilized. Conventional systems, however, are limited in that the retransmissions result in increased transmission latency on the reverse link channels.

The resource management techniques of conventional systems allow a mobile station to transmit a reverse link signal at higher relative transmission power levels where payload sizes are larger. For relatively smaller payloads, however, the mobile station is required to transmit at generally lower relative power levels resulting in approximately the same average latency times for all payload sizes.

Accordingly, there is a need for an apparatus, system, and method for efficiently managing reverse link resources in a communication system based on latency considerations.

BRIEF DESCRIPTION OF THE DRAWINGS

FIG. 2 is an illustration of a table representing an exemplary reverse link transmission guideline where the reverse link transmission power levels and the payload sizes are represented by alphanumeric variables.

FIG. 3 is an illustration of a table representing an exemplary reverse link transmission guideline established using a boost value received from a base station.

FIG. 4 is an illustration of a table representing a reverse link transmission guideline including exemplary values where the payload sizes are represented in bits and the transmission power levels are represented in traffic to pilot ratios (TPRs).

DETAILED DESCRIPTION OF THE PREFERRED EMBODIMENTS

Figure 1:
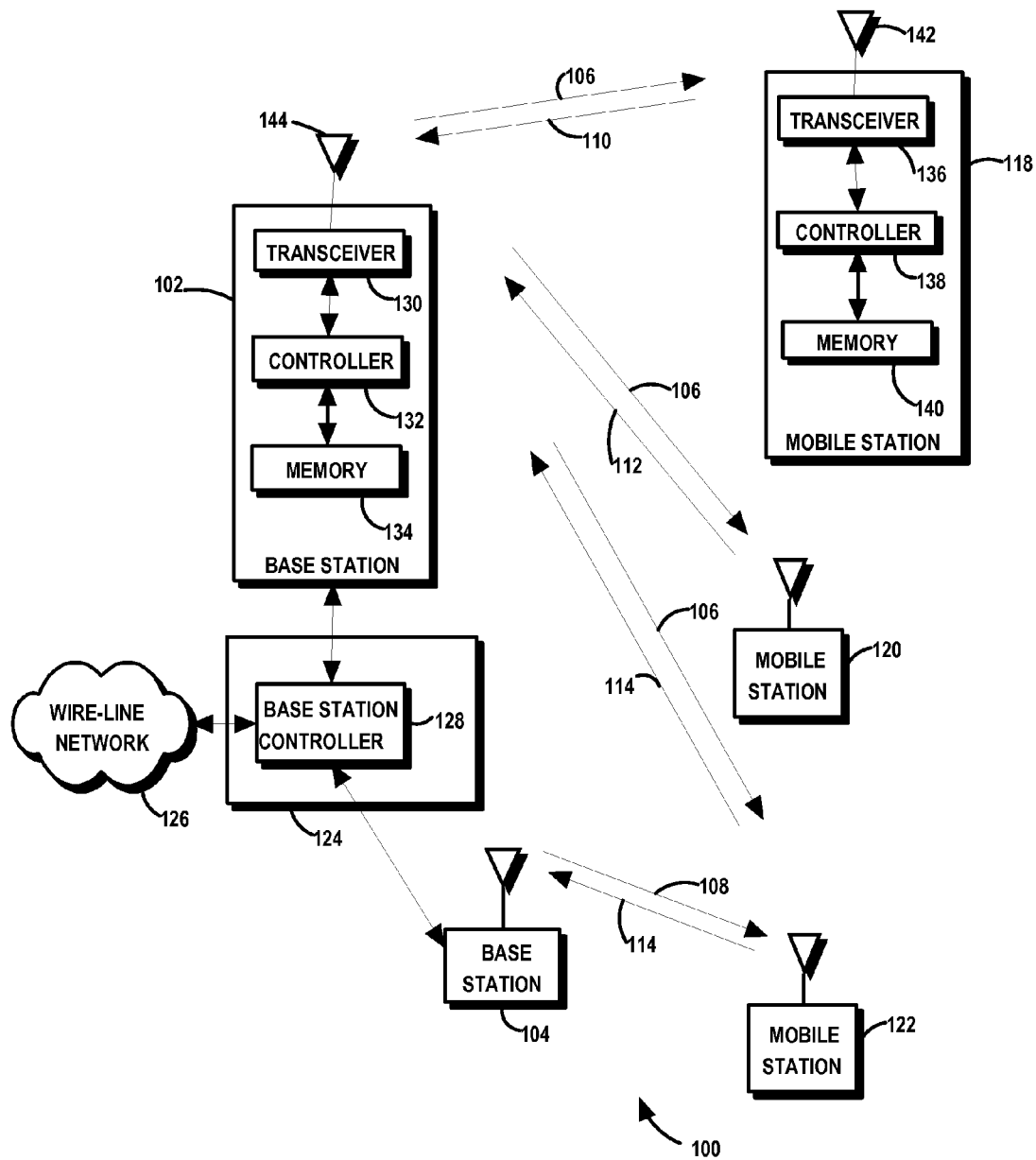
FIG. 1 is a block diagram of a communication system in accordance with the exemplary embodiment of the invention.

In accordance with an exemplary embodiment of the invention, an apparatus, system, and method efficiently manage reverse link resources by allowing a mobile station to select between transmitting a payload at a standard power level and transmitting a smaller payload at a boosted power level. As a result, the mobile station can autonomously select a QoS (Quality of Service) level for individual packets based on delay requirements of individual packets. Based on reverse link transmission information received from a base station, the mobile station derives a reverse link transmission guideline defining the power levels and associated payloads for at least a standard service and boosted service. The mobile station selects a reverse link transmission power level from a plurality of power levels including at least a standard reverse link transmission power level associated with a standard payload size and a boosted reverse link transmission power level associated with a boosted payload size where the standard payload size is greater than the boosted payload size.

In the exemplary embodiment, the reverse link signals are transmitted in accordance with a hybrid automatic repeat response (HARQ) protocol. In order to efficiently utilize reverse link resources, the reverse link transmission power levels are maintained at levels that result in multiple re-transmissions to successfully transfer payloads of most of the reverse link signals. The retransmission scheme results in an increased system capacity for time varying channels since an early termination of the retransmission scheme occurs when a good channel is utilized. Payloads sent with reverse link signals transmitted at relatively higher transmission power levels experience less retransmission and, as a result, experience a lower latency on average than payloads transmitted at lower transmission power levels. Selecting a particular power level for transmitting a payload affects the number of required retransmissions to achieve a desired frame error rate and thereby provides a mechanism to control the compromise between latency of the packet and system capacity. In a distributed system using reverse link (or uplink) transmissions, a centralized scheduling entity at a base station is not likely to be aware of latency requirements of future reverse link packets to be transmitted from the mobile station. Based on available reverse link resources and the mobile stations generic reverse link transmission requirements, the base station assigns authorized transmission power levels. In accordance with the authorized limits, the mobile station selects between transmitting a smaller payload at a lower latency and transmitting a larger payload at a higher latency. Accordingly, mobile stations autonomously select an allowable combination of payload size and reverse link transmission power level based on a preferred QoS level of a packet or the QoS level of service established between the mobile station and the base station. In the exemplary embodiment, reverse link transmission power levels are characterized, defined, and managed in terms of traffic to pilot power ratios (TPR) where a power control mechanism maintains the power of the pilot signal a desired level at the receiver for sufficient channel estimation. The TPRs, therefore, provide a scale factor for determining the actual transmission power of the traffic channel. Those skilled in the art will recognize that various other techniques may be used in some circumstances to define and characterize transmission power levels. Further, more than two levels of service may be provided in some circumstances.

In the exemplary embodiment, a QoS indicator transmitted from the mobile station to the base station through the associated control channel indicates a selected QoS level of a transmitted packet. Based on the QoS indicator, the base station determines the TPR used by the mobile station resulting in improved received performance.

One or more exemplary embodiments described herein are set forth in the context of a digital wireless data communication system. While use within this context is advantageous, different embodiments of the invention may be incorporated in different environments or configurations. In general, the described systems may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or may represent method steps or functions.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the World Wide Web or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Further, one or more embodiments of the invention are also applicable to orthogonal frequency division multiple access (OFDMA) systems. Performance of an OFDMA system on a reverse-link is limited by interference received from mobiles in neighboring cells and a base station or a centralized entity has to ensure that the mobile stations do not transmit at a power level more than that is required. The base station assigns the frequency tones, also called subcarriers, and the standard payload format to be transmitted at the specified TPR on the reverse link. TPR in the context of OFDMA refers to the ratio of the power on a data tone to the power on a pilot tone. In an exemplary embodiment, the mobile station may transmit the standard payload format corresponding to the assigned TPR or chose to transmit a boosted payload format at lower coding rate and/or lower modulation order but at the specified TPR on the assigned subcarriers. The boosted payload format corresponding to a standard payload format is pre-determined by both base stations and the mobile station with a one-to-one correspondence. The mobile station may transmit a QoS indicator if a control channel is associated with a packet transmission on the reverse-link. In the case of a fully scheduled OFDMA system such as 802.16, published by Institute of Electrical and Electronics Engineering (IEEE), the mobile station is not assigned a traffic control channel on the reverse-link. In such cases, the base station may do a blind detection by attempting to decode both the standard and the boosted payload formats transmitted at the specified TPR. The presence of cyclic redundancy check (CRC) enables the base station receiver to determine if the decoded payload is correct.

FIG. 1 is a block diagram of a communication system 100 in accordance with an exemplary embodiment of the invention. The communication system 100 is capable of operating in accordance with any wireless communication system standards and may be for communication of voice, data, or both in the exemplary embodiment. The exemplary communication system 100 includes base stations 102-104 that exchange data and control information through communication links 106-114 between a number of mobile stations 118-122 and a wire-line network 126 including a public switch telephone and data network. As discussed below in further detail, the mobile stations 118-122 and the base stations 102, 104 may include any number of components that facilitate the operation within the communication system 100.

In some situations, the base station 102 may be in communication with other base stations 104. The base stations 102-104 and various control nodes (not shown) control various operating aspects of the communication system 100 and in relation to a backhaul 124 between the wire-line network 126 and the base stations 102,104. The backhaul 124 includes equipment and infrastructure for facilitating the exchange of data and other information between the wire-line network 126 and the base stations 102, 104 and includes at least a base station controller (BSC) 128 in the exemplary embodiment.

Each base station 102, 104 communicates with mobile stations 118-122 that are within the coverage area of the particular base station through a forward link signal 106-108 and reverse link signals 110-114. The forward link signals targeted for mobile stations 118-120 may be summed to form a forward link signal 106. In the exemplary situation illustrated in FIG. 1, one base station 102 communicates with the mobile stations 118-122 using one forward link signal 106 and the other base station 104 uses another forward link signal 108 to communicate with a mobile station 122. The forward link may carry a number of different forward link channels such as control channels. A control channel may be shared among the mobile stations 118-122 for receiving control information. The mobile stations 118-122 communicate with the base stations 102-104 using corresponding reverse link signals 110, 112, 114 transmitted from the mobile stations 118-122 to the base stations 102-104. A reverse link signal 114 targeted for one base station 104 may be received and decoded at other base stations 102. Since the mobile stations 118-122 may move from one location to another and since channel conditions may change, the mobile stations 118-122 maintain an active set of base stations that may be used for communication in accordance with known techniques.

The mobile station 118 may include any combination of hardware, software, and firmware that performs the functions to the mobile stations 118-122 as described herein and, in the exemplary embodiment, includes a transceiver 136, a controller 138, and memory 140. The functions and operations of the mobile station blocks described in FIG. 1 may be implemented in any number of devices, circuits, or software. Two or more of the functional blocks may be integrated in a single device and the functions described as performed in any single device or block may be implemented over several devices. For example, some receiving or transmitting processes may be performed by the controller 138.

The mobile station 118 includes a radio transceiver 136 configured to communicate with base station 102-104 in accordance with the protocols of the particular communication system 100. The transceiver 136 includes a transmitter and a receiver in the exemplary embodiment. Radio frequency signals are exchanged through one or more antenna 142. The radio transceiver 138 modulates, amplifies, and transmits reverse link signals through the reverse link and receives and demodulates forward link signals 106 transmitted by the base station 102 through the forward link.

The controller 138 is any processor, microprocessor, computer, microcomputer, or processor combination suitable for performing the control and calculation functions of the mobile station 118 described herein as well as facilitating the overall functionality of the mobile station 118. Software code running on the controller 138 executes the steps of methods for processing signals and for performing the reverse link management functions of the exemplary embodiments.

The memory 140 is any suitable memory for storing values, parameters, software code, and other information in accordance with known techniques. The memory 140 may be implemented within an integrated circuit (IC), for example.

The base station 102 may include any combination of hardware, software, and firmware that performs the functions to the base stations 102-104. The functions and operations of the blocks described in FIG. 1 may be implemented in any number of devices, circuits, or software. Two or more of the functional blocks may be integrated in a single device and the functions described as performed in any single device or block may be implemented over several devices. For example, some receiving processes may be performed by the controller 132.

The base station includes a radio transceiver 130 configured to communicate with mobile stations 118-122 in accordance with the protocols of the particular communication system 100. The transceiver 130 includes a receiver and transmitter. Radio frequency signals are exchanged through the antenna 144 which may include sectors in some circumstances. The radio transceiver 130 modulates, amplifies, and transmits signals through the forward link and receives and demodulates reverse link signals transmitted by the mobile stations 118-120 through the reverse link.

The controller 132 is any processor, microprocessor, computer, microcomputer, or processor combination suitable for performing the control and calculation functions of the base station 102 described herein as well as facilitating the overall functionality of the base station 102. Software code running on the controller 132 executes the steps of methods for processing signals and for performing the reverse link management functions of the exemplary embodiments.

The memory 134 is any suitable memory for storing values, parameters, software code, and other information in accordance with known techniques. The memory 134 may be implemented within an integrated circuit (IC), for example.

The base stations 102-104 transmit control commands through the forward link signals 106, 108 to the mobile stations 118-122. The control commands may include any number of parameters, values, bits or other information in accordance with the particular communication standard utilized in the communication system 100. In the exemplary embodiment, the control commands include reverse link control parameters providing the mobile station 118 with information adequate to determine an authorized reverse link power level (authorized TPR). Examples of reverse link control parameters include rate control commands and payload assignment messages. The authorized reverse link power level (authorized TPR) is the maximum reverse link power permitted by the base station 102 and provides the base station 102 with a mechanism for controlling the interference of reverse link transmissions to other reverse link transmissions from other mobile stations 120, 122. In addition to an authorized reverse link power level such as an authorized traffic to pilot power ratio (authorized TPR), the base station 102 conveys other reverse link transmission information such as reverse link transmission parameters that include information allowing the mobile station 118 to maintain a reverse link transmission guideline. Any of several techniques may be used to convey reverse link transmission parameters. For example, the representations of the reverse link transmission parameters may be transmitted to the mobile station 118. Examples of communication systems capable of supporting such a mechanism include fully scheduled CDMA and OFDMA communication systems. In some circumstances, such as rate controlled CDMA systems for example, only limited information may be transmitted such as indications of changes of the reverse link transmission parameters. Further, reverse link transmission indicators received at the mobile station 118 may identify a set of parameters that are stored in the memory 140.

Although reverse link transmission guidelines may be maintained using any of several techniques, the mobile station 118 maintains values in memory 140 relating traffic to pilot power ratios (TPRs) to reverse link payloads in the exemplary embodiment. As discussed below in further detail with reference to FIGS. 2-4, the reverse link transmission guideline relates power levels such as TPR values for at least two quality of service (QoS) levels. In the exemplary embodiment, a plurality of standard TPR values correspond to payload sizes for standard transmissions and a plurality of boosted TPR values correspond to the payload sizes for boosted transmissions. The boosted TPR values are generally higher than standard TPR values for corresponding payload sizes. Based on the payload size of a reverse link signal and the authorized TPR, the mobile station 118 selects either a standard TPR or boosted TPR for transmitting the reverse link signal. Although various criteria may be used to select the TPR, the mobile station 118 selects the TPR in accordance with the most compatible latency and payload size combination. For example, the mobile station 118 may select the standard TPR where the particular payload is a relatively large FTP file and a higher latency can be tolerated. On the other hand, the mobile station 118 may select the boosted TPR where the payload is a short packet and where a low latency is preferred. Low latency is often preferred in real time applications such as video applications.

When selecting the reverse link transmission power level, the mobile station 118 identifies the highest standard power level and the highest boosted power level that meet the requirements of an authorized reverse link transmission power level (AUTH_PWR) and evaluates the corresponding payload sizes considering the current payload size and latency preferences. In the exemplary embodiment, the highest standard TPR and the highest boosted TPR correspond to the TPRs that are associated with a payload and are used by the mobile station 118 for the required quality of service when transmitting a payload. Accordingly, the highest standard power level is identified as the standard power level (standard TPR) corresponding to the payload format that is less than or equal to authorized power level. The highest boosted power level is identified as the boosted power level (boosted TPR) corresponding to the payload format and that is less than or equal to the sum of the standard power level (standard TPR) and a margin factor (q). The margin factor provides a margin above the highest standard TPR within which the mobile station 118 is allowed to transmit a reverse link signal in boosted mode. The margin, therefore, provides a mechanism for reducing the effects of quantization when a limited number of payload formats are defined by the communication system 100. The selection of a boosted TPR after the determination of the standard TPR allows the system 100 to maintain a reference point for updating the authorized TPR. Therefore, in communication systems using a rate determination process, the algorithm for selecting standard payload is retained and the mobile station 118 can transmit a payload at a boosted power level after rate determination process identified the standard payload. In some circumstances, the highest boosted power level is directly identified as the boosted power level corresponding to the payload that is less than the maximum authorized power level.

FIG. 2 is an illustration of a table representing an exemplary reverse link transmission guideline 200 where the reverse link transmission power levels and the payload sizes are represented by alphanumeric variables. The reverse link transmission guidelines 200 define relationships between the allowable transmission power levels (204, 208) and a plurality of payload sizes 202, 206 for at least two QoS (quality of service) classes. As discussed below, the reverse link transmission guideline 200 defines transmission power levels (204, 208) in terms of traffic to pilot ratios (TPRs) for a standard service and for a boosted service for several reverse link transmission power levels 204, 208 in the exemplary embodiment. "Payload" refers to certain number of information bits coded and modulated according to some known format and transmitted on a traffic channel such a packet data channel (PDCH). The payload may be defined by any combination of parameters indicating a number of bits in a payload, a code rate, a modulation order, or a CRC. Any number of transmission power levels 204, 208 and payload sizes 202, 206, however, may be defined in any of several formats, ratios, and units depending on the implementation of the particular communication system 100. The table in FIG. 2 includes a set of standard payload sizes 202 and a set of boosted payload sizes 206. In the exemplary embodiment, a single set of payload sizes are associated with a set of standard power levels 204 and a set of boosted power levels 208 such that each payload size is associated with a standard power level and a boosted power level. In the exemplary embodiment, each standard power level value is less than the corresponding boosted power level value for the same payload size. Although the exemplary reverse link transmission guidelines 200 are illustrated as tables, the guidelines 200 may be implemented and executed in any of several ways and the relationships between the various values may not necessarily be maintained as arrays in memory.

As described above, the mobile station 118 maintains an authorized reverse link transmission power level (AUTH_PWR) that may be transmitted, modified, updated, or otherwise established by the base station 102. The mobile station 118 is authorized to transmit a reverse link signal at any power level that is less than or equal to the authorized reverse link transmission power level and that meets the requirements defined by the reverse link transmission guideline 200 for payload size 202, 206 and reverse link transmission power 204, 208. In systems utilizing orthogonal reverse link transmissions, the reverse link signal uses an assigned code space as data rate associated with subcarriers assigned to a mobile station in an OFDMA system.

Those skilled in the art will recognize the various suitable techniques for conveying the reverse link transmission information to the mobile stations 118 based on known techniques as applied to the teachings herein. As mentioned above, the base station 102 transmits control information through the forward link that includes the reverse link transmission information suitable for maintaining the reverse link transmission guidelines 200. Any combination of indicators, adjustment indicators, and transmitted values, as well as stored values at the mobile station 118 may be used to generate the reverse link transmission guidelines 200. For example, the values representing the reverse link transmission parameters may be transmitted directly from the base station 102 to mobile station 118 every time the guideline 200 is changed or generated. In some circumstances, only changed values may be transmitted. In other situations, the information transmitted from the base station 102 may only include difference values to relate a boosted power level to a standard power level for the same payload size. In the exemplary embodiment, a single set of payload sizes 202, 206 are static and are not adjusted by information transmitted by the base station. Further, the reverse link transmission guidelines 200 are defined by default values prior to application of the reverse link transmission parameters received from the base station.

One exemplary technique for establishing a reverse link transmission guideline 200 includes establishing a set of payload sizes and standard power levels in accordance with known techniques and deriving a set of boosted transmission power levels 208 from reverse link parameters received from the base station 102. FIG. 3 is an illustration of a table representing an exemplary reverse link transmission guideline 200 established using boost value, D received from a base station 102. The boost value, D indicates the difference between a standard transmission power level 204 and a boosted transmission power level 208 for a corresponding payload size 302. Observing the variables in the third row of the table of FIG. 3, for example, the power level S3 corresponds to the payload size P3. The boosted power level 208 for payload size P3 is equal to the sum of S3 and D (S3+D). In addition to the reverse link parameters required to establish the guideline 200 the base station 102 transmits other reverse link transmission information allowing the mobile station 118 to determine the appropriate transmission power level for a reverse link signal. An example of additional reverse link information includes a power margin (q) that indicates a margin over the highest standard power level below the authorized power level within which the mobile station 118 can transmit in boosted mode. In some circumstances the values of q and D vary between the various payload sizes although in the exemplary embodiment q and D are constant.

Other methods of generating the boosted power levels 208 may include other parameters that provide the appropriate relationships between the payload sizes and the power levels 204, 208. In some situations, for example, the reverse link parameters may include a payload reduction value, R indicating the reduction in payload size from a standard payload size to a boosted payload size corresponding to a particular power level.

Any of several techniques may be used to establish and maintain a reverse link transmission guideline 200. Two exemplary techniques are provided immediately below. In a first exemplary technique, the mobile station 118 maintains a variable, AUTH_PWR that represents the reverse link transmission power level authorized by the base station 102. The base station 102 may establish and change AUTH_PWR by any combination of grant message and rate control transmissions. Based on the AUTH_PWR, the mobile station 118 determines a payload format that is authorized for standard mode using the guideline 200. A suitable method for determining the payload format includes determining the largest payload that corresponds to the standard power level equal to or less than the AUTH_PWR. Where, for example, AUTH_PWR is greater than S3 but less than S4 (S3<AUTH_PWR<S4), the mobile station 118 identifies P3 as the largest allowable standard payload size.

Two examples for selecting a boosted payload size are discussed immediately below. In a first example, the mobile station 118 calculates the boosted power level and the corresponding payload size based on the standard power level S3 corresponding to the payload size P3, the boost parameter D, and the margin q. A suitable method for determining the boosted payload format includes determining the largest payload that corresponds to the boosted power level equal to or less than S3+q. Where, for example, S3+q is greater than boosted power level S2+D but less than S3+D (S2+D<S3+q<S3+D), the mobile station identifies P2 as the largest allowable boosted payload size.

In a second technique, the highest boosted payload format is determined directly from AUTH_PWR. If S2+D<AUTH_PWR<S3+D, P2 is selected as the largest allowable boosted payload size. The mobile station 118 selects the boosted power level or the standard power level based on the latency requirements and payload of the reverse link signal. The first technique is preferred to second embodiment in scenarios where the mobile station chooses to transmit in boosted mode, but transmits a payload size P1 lower than the maximum allowable boosted payload size P2 due to other constraints such as power and data constraints. In the first technique, there is a one to one mapping between the selected standard payload format and the boosted payload format. If the mobile station 118 chooses to transmit at P1 instead of P2 in the boosted case, the base station 102 can derive the corresponding standard payload format and update the AUTH_PWR based on the standard payload power level. In the second technique, the same standard payload format P3 may be selected for different values of AUTH_PWR while different boosted payload formats (e.g. P2 and P3) may be selected. The variable AUTH_PWR that is used by the mobile station 118 may not be known to the base station 102. In such a situation, transmitting either P2 or P3 in boosted mode will lead to larger ambiguity at the base station 102 in determining the mobile station's 118 AUTH_PWR.

In a second technique, the mobile station 118 establishes the transmission guideline 200 and determines the largest payload size corresponding to the largest standard power level less that or equal to AUTH_PWR and the largest payload size corresponding to the largest boosted power level that is less than or equal to AUTH_PWR. Based on the latency requirements and payload of the reverse link signal, the mobile station 118 selects between the largest boosted power level and the largest standard power level. In the second technique, the margin factor q may be added to AUTH_PWR to determine the largest boosted power level (i.e. largest boosted power level<AUTH_PWR+q).

FIG. 4 is an illustration of a table representing a guideline 200 including exemplary values where the payload sizes 302 are represented in information bits and the transmission power levels 204, 208 are represented in traffic to pilot ratios (TPRs). Two examples are discussed with reference to FIG. 4 illustrating the two exemplary techniques of using a reverse link transmission guideline for determining an appropriate power level and payload size combination for a reverse link signal.

In an example of the first technique, AUTH_PWR is equal to 12.2 dB, D is equal to 2 dB and q is equal to 0.5 dB. Accordingly, the payload corresponding to the largest standard TPR is 1560 bits since the corresponding standard TPR of 10.1 dB is less than the authorized TPR of 12.2 dB but is greater than the next highest standard TPR of 12.6. Adding 0.5 dB to the highest standard TPR results in 10.6. Accordingly, the largest boosted TPR is 9.3 dB which is the sum of 7.3 dB and 2.0 dB. The mobile station 118 selects between transmitting a payload of 792 bits at 9.3 dB in boosted mode and transmitting a payload of 1560 bits at 10.1 dB.

In an example of the second technique, AUTH PWR is 12.2 dB, D is equal to 2 dB and q is not used. After the mobile station 118 generates or otherwise establishes the reverse link transmission guideline 200 using the parameters, the payloads corresponding to the largest standard TPR and the largest boosted TPR are determined. Since 10.1 dB (corresponding to 1560 bits)<12.2 dB<12.6 dB (corresponding to 3096 bits), the largest standard TPR is 10.1 which has an associated payload size of 1560. The largest boosted TPR is 10.1 dB since 12.1 dB (corresponding to 1560 bits)<12.2 dB<14.6 dB (corresponding to 3096 bits). Accordingly, the payload size for boosted mode is 1560 bits. The mobile station 118 selects between transmitting a payload of 1560 bits at 12.2 dB in boosted mode and transmitting a payload of 1560 bits at 10.1 dB.

In order to efficiently manage the reverse link resources, the base stations 102 utilize rate control algorithms and signaling in the exemplary embodiment. The rate control may be accomplished by transmitting grant messages, rate control indicators (RCI) or any combination of the two. An example of a suitable technique for rate control is addressed below and is described in further detail in related patent application entitled "METHOD AND APPARATUS FOR CONTROLLING REVERSE LINK DATA RATE OF A MOBILE STATION IN A COMMUNICATION SYSTEM WITH REVERSE LINK COMMON RATE CONTROL" filed on May 25, 2004. A grant message is transmitted to the mobile station 118 indicating the authorized TPR and the RCI provide information for adjusting the TPR. The RCIs include RATE_DOWN, RATE_HOLD and RATE_UP indicators. To facilitate rate control in the exemplary embodiment, a service indicator (QoS indicator) is transmitted from the mobile station 118 to the base station 102 indicating the type of service used to transmit the payload. A suitable mechanism for transmitting the QoS indicator in a communication system operating in accordance with CDMA Revision D standards includes transmitting a one bit indicator on the Reverse Packet Data Control Channel (R-PDCCH). As is known, the R-PDCCH carries information corresponding to the packet format on the Reverse Packet Data Channel (R-PDCH). The one bit indicator indicates whether the transmitted reverse link signal 110 is being transmitted with standard service (or standard QoS) or with boosted service (or boosted QoS).

Figure 5:
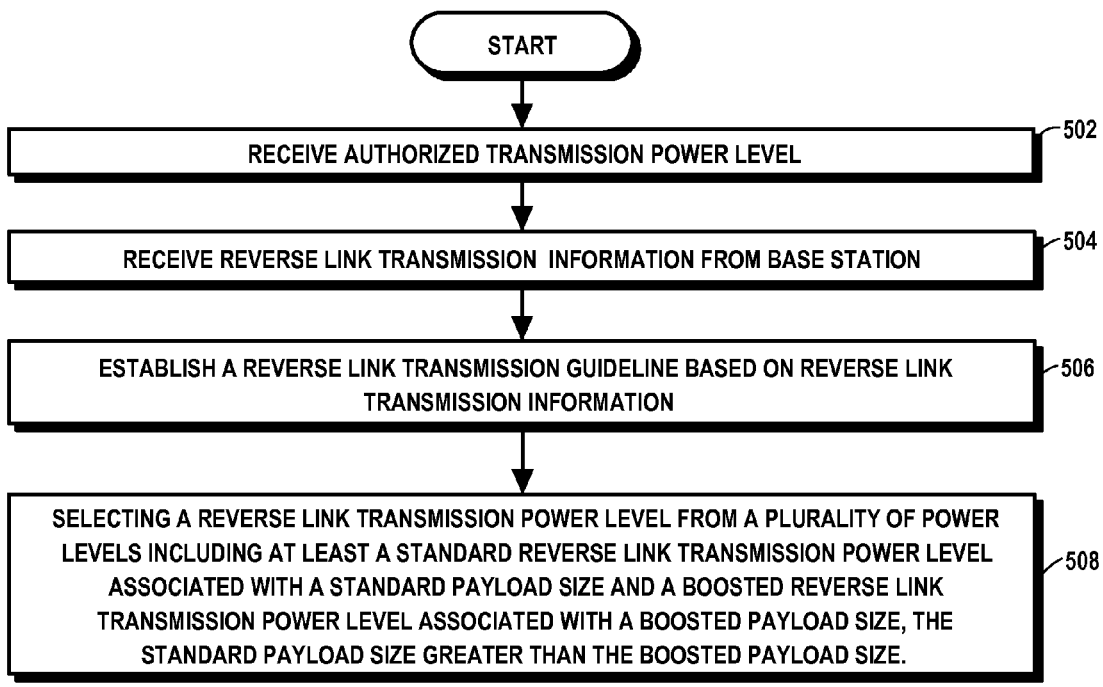
FIG. 5 is a flow chart of a method of managing reverse link resources performed at a mobile station in accordance with the exemplary embodiment of the invention.

FIG. 5 is a flow chart of a method of managing reverse link resources performed at a mobile station 118 in accordance with the exemplary embodiment of the invention. The method may be performed, either solely or in combination, by hardware, software, and firmware. The exemplary method described with reference to FIG. 5 is performed in a mobile station 118 having functional blocks including at least a controller 138 and a memory 134. As described above, the functional blocks identified in the mobile station 118 may be implemented using any combination of components, processors and software code and may be implemented in a single device or distributed over several components or devices.

At step 502, a reverse link authorized power level (AUTH_PWR) is established at the mobile station 118. In the exemplary embodiment, the base station 102 transmits a combination of grant and rate control messages to maintain an authorized reverse link transmission power level value (AUTH_PWR). In accordance with a rate control method, the base station 102 may periodically adjust AUTH_PWR by transmitting RCIs to the mobile station 118.

At step 504, reverse link transmission information is received from the base station 102. The reverse link transmission information includes information, values, parameters or other indicators suitable for establishing a reverse link transmission guideline 200 at the mobile station 118. In the exemplary embodiment, the reverse link information includes at least information to establish standard TPR values in accordance with known techniques as well as information allowing a determination of the boosted TPR values. Examples of suitable reverse link parameters include a boost value, D, a margin factor, q, a maximum number of sub-packets for a standard transmission, a maximum number of sub-packets for boosted transmission size for a boosted mode transmission, and a the authorized TPR. In some circumstances, other parameters may be transmitted such as a payload reduction factor, R that indicates the decrease in the number of payload sizes required for boosted transmission.

At step 506, a reverse link transmission guideline 200 is established based on at least a portion of the reverse link information. In the exemplary embodiment, standard payload sizes are stored in memory and associated with standard power level values and boosted transmission power level values generated based on the received reverse link transmission information. Suitable methods of establishing the guidelines 200 include the two exemplary techniques described above with reference to FIG. 3 and FIG. 4. Other method and techniques may be used in some situations.

At step 508, the mobile station selects a reverse link transmission power level from a plurality of power levels including at least a maximum standard transmission power level and maximum boosted transmission power level compliant with the authorized reverse link transmission power level. In the exemplary embodiment, the mobile station 118 determines latency requirement of a packet to be transmitted and evaluates the power level values for standard mode and boosted mode and the related payload sizes. Based on the required QoS of the particular packet the mobile station 118 selects between payload and power level combinations for standard and boosted mode.

Figure 6:
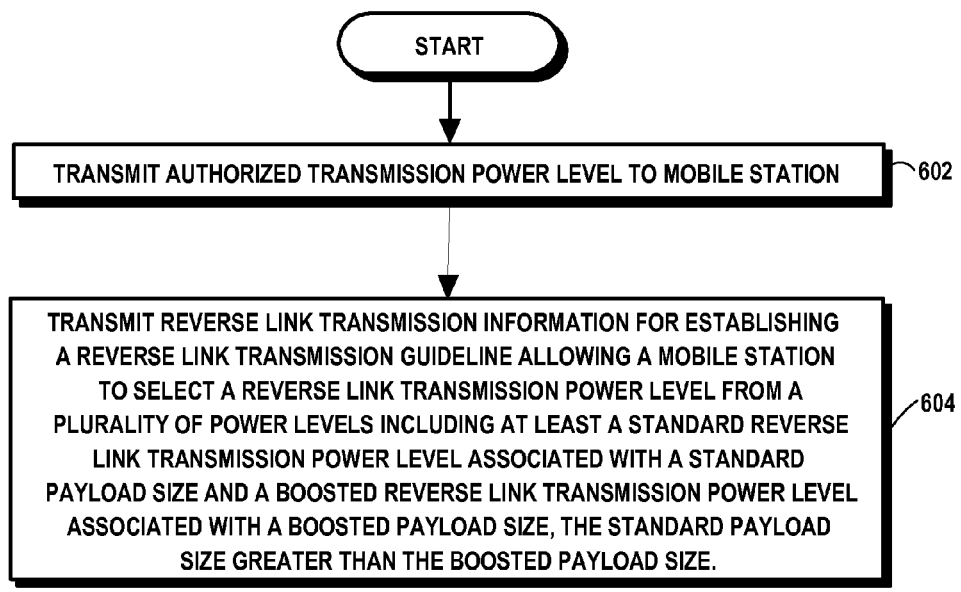
FIG. 6 is a flow chart of a method of managing reverse link resources performed in a base station in accordance with the exemplary embodiment of the invention.

FIG. 6 is flow chart of a method of managing reverse link resources performed in a base station 102 in accordance with the exemplary embodiment of the invention. The method may be performed, either solely or in combination, by hardware, software, and firmware. The exemplary method described with reference to FIG. 6 is performed in a base station 102 having functional blocks including at least a controller 132, a transceiver 130 and a memory 134. As described above, the functional blocks identified in the base station 102 may be implemented using any combination of components, processors and software code and may be implemented in a single device or distributed over several components or devices.

At step 602, the base station conveys the authorized reverse link transmission power level to the mobile station 118. The base station may transmit any number of grant messages and rate control indicators (RCI) to maintain the appropriate value of AUTH_PWR as maintained the mobile station 118.

At step 604, the base station transmits the reverse link transmission information that establishes the reverse link transmission guideline 200 at the mobile station 118. The reverse link transmission guidelines 200 allows the mobile station 118 to select a reverse link transmission power level without requesting further authorization from base station 102. As discussed above, mobile station selects between a boosted power level and a standard power level.

Therefore, in the exemplary embodiment, a mobile station 118 can select between transmitting a payload at a standard power level and transmitting a smaller payload at boosted power level. The base station 102 establishes the reverse link transmission guidelines by transmitting reverse link information to the mobile station 118. Using the guidelines 200, the authorized power reverse link power level and the QoS requirements of reverse link packets, the mobile station 118 selects the appropriate power level and payload size combination for reverse link packets without requesting authorization from the base station 102. Accordingly, the reverse link power levels and payloads are managed to efficiently allocate reverse link resources.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for managing resources of a communication link from a mobile station to a base station in a communication system, the method comprising:
receiving an authorized power level, the authorized power level indicating allowance of transmissions of a first payload size transmitting at a standard power level or a second payload size transmitting at a boosted power level; determining a hybrid automatic response (HARQ) latency time for transmitting a data packet to the base station; and depending on HARQ latency time, either transmitting the data packet at the second payload size using the boosted power level or transmitting the data packet at the first payload size using the standard power level.

2. The method as recited in claim 1 further comprising:
relating the authorized power level to a traffic to pilot power ratio, thereby the boosted power level being a boosted traffic to pilot power ratio and the standard power level being a standard traffic to pilot power ratio.

3. The method as recited in claim 1 wherein the HARQ latency time of transmitting the data packet is in accordance with a hybrid automatic response protocol.

4. The method as recited in claim 1 wherein the second payload size is smaller than the first payload size.

5. The method as recited in claim 1 further comprising:
receiving the transmitted data packet at either the first payload size at the standard power level or the second payload size at the boosted power level.

6. An apparatus for managing resources of a communication link from a mobile station to a base station in a communication system, the apparatus comprising:
a transceiver for receiving an authorized power level, the authorized power level indicating allowance of transmissions of a first payload size transmitting at a standard power level or a second payload size transmitting at a boosted power level; a controller for determining a HARQ latency time for transmitting a data packet to the base station; the transceiver further for either transmitting the data packet at the second payload size using the boosted power level or transmitting the data packet at the first payload size using the standard power level depending on the HARQ latentcy time.

7. The apparatus as recited in claim 6 wherein the transceiver is further configured for relating the authorized power level to a traffic to pilot power ratio, thereby the boosted power level being a boosted traffic to pilot power ratio and the standard power level being a standard traffic to pilot power ratio.

8. The apparatus as recited in claim 6 wherein the HARQ latency time of transmitting the data packet is in accordance with a hybrid automatic response protocol.

9. The apparatus as recited in claim 6 wherein the second payload size is smaller than the first payload size.

10. The apparatus as recited in claim 6 wherein the base station is further configured for receiving the transmitted data packet at either the first payload size at the standard power level or the second payload size at the boosted power level.

11. A apparatus for managing resources of a communication link from a mobile station to a base station in a communication system, the apparatus comprising:
means for receiving an authorized power level, the authorized power level indicating allowance of transmissions of a first payload size transmitting at a standard power level or a second payload size transmitting at a boosted power level; means for determining a HARQ latency time for transmitting a data packet to the base station; and means for depending on HARQ latency time, either transmitting the data packet at the second payload size using the boosted power level or transmitting the data packet at the first payload size using the standard power level.

12. The apparatus as recited in claim 11 further comprising:
means for relating the authorized power level to a traffic to pilot power ratio, thereby the boosted power level being a boosted traffic to pilot power ratio and the standard power level being a standard traffic to pilot power ratio.

13. The apparatus as recited in claim 11 wherein the HARQ latency time of transmitting the data packet is in accordance with a hybrid automatic response protocol.

14. The apparatus as recited in claim 11 wherein the second payload size is smaller than the first payload size.

15. The apparatus as recited in claim 11 further comprising:
means for receiving the transmitted data packet at either the first payload size at the standard power level or the second payload size at the boosted power level.

16. A computer readable medium storing a program embodying a method for managing resources of a communication link from a mobile station to a base station in a communication system, the method comprising:
receiving an authorized power level, the authorized power level indicating allowance of transmissions of a first payload size transmitting at a standard power level or a second payload size transmitting at a boosted power level; determining a HARQ latency time for transmitting a data packet to the base station; and depending on the HARQ latency time, either transmitting the data packet at the second payload size using the boosted power level or transmitting the data packet at the first payload size using the standard power level.

17. The computer readable medium as recited in claim 16 wherein the program further embodies the method comprising:
relating the authorized power level to a traffic to pilot power ratio, thereby the boosted power level being a boosted traffic to pilot power ratio and the standard power level being a standard traffic to pilot power ratio.

18. The computer readable medium as recited in claim 16 wherein the HARQ latency time of transmitting the data packet is in accordance with a hybrid automatic response protocol.

19. The computer readable medium as recited in claim 16 wherein the second payload size is smaller than the first payload size.

20. The computer readable medium as recited in claim 16 wherein the program further embodies the method comprising:
receiving the transmitted data packet at either the first payload size at the standard power level or the second payload size at the boosted power level.

* * * * *